United States Patent
Tang et al.

(10) Patent No.: US 12,323,779 B2
(45) Date of Patent: Jun. 3, 2025

(54) SOUND SOURCE LOCALIZATION SYSTEM

(71) Applicant: Himax Technologies Limited, Tainan (TW)

(72) Inventors: Ti-Wen Tang, Tainan (TW); Tzu-Hsu Chen, Tainan (TW); Chin-Kuei Hsu, Tainan (TW); Ching-Han Chou, Tainan (TW)

(73) Assignee: Himax Technologies Limited, Tainan (TW)

( * ) Notice: Subject to any disclaimer, the term of this patent is extended or adjusted under 35 U.S.C. 154(b) by 235 days.

(21) Appl. No.: 18/211,003

(22) Filed: Jun. 16, 2023

(65) Prior Publication Data

US 2024/0422476 A1 Dec. 19, 2024

(51) Int. Cl.
*H04R 3/00* (2006.01)
*G10L 15/02* (2006.01)
*H04N 5/262* (2006.01)
*H04R 1/40* (2006.01)
*H04R 29/00* (2006.01)

(52) U.S. Cl.
CPC .............. *H04R 3/005* (2013.01); *G10L 15/02* (2013.01); *H04N 5/2628* (2013.01); *H04R 1/406* (2013.01); *H04R 29/005* (2013.01)

(58) Field of Classification Search
CPC ...... H04R 3/005; H04R 1/406; H04R 29/005; G10L 15/02; G10L 15/10; H04N 5/2628
USPC .......................................... 381/56, 58, 91, 92
See application file for complete search history.

(56) References Cited

U.S. PATENT DOCUMENTS

| | | | |
|---|---|---|---|
| 2017/0186441 A1* | 6/2017 | Wenus | H04N 7/15 |
| 2019/0180731 A1* | 6/2019 | Leppanen | H04S 7/306 |
| 2021/0329405 A1* | 10/2021 | Eubank | H04S 7/305 |
| 2025/0010482 A1* | 1/2025 | Quinlan | G06F 3/016 |

OTHER PUBLICATIONS

Dokmanic, Can one hear the shape of a room: the 2-D polygonal case, (Year: 2011).*

* cited by examiner

*Primary Examiner* — William A Jerez Lora
(74) *Attorney, Agent, or Firm* — Donald E. Stout; Stout, Uxa & Buyan, LLP

(57) ABSTRACT

A sound source localization system includes a microphone array composed of a plurality of microphones each converting sound wave into a corresponding voice signal; a room shape estimator that determines a room shape including a location map and a corresponding template voice feature map composed of template voice features associated with a virtual sound source disposed at different locations respectively, and outputs a room reliability indicating confidence about the determined room shape; a lookup table (LUT) that pre-stores the location map and the corresponding template voice feature map; and a localizer that determines a location of a sound source according to the room reliability and similarity between a voice feature associated with the sound source and the template voice features of the template voice feature map.

9 Claims, 5 Drawing Sheets

| time difference | Mic 1 | Mic 2 | Mic 3 | Mic 3 |
|---|---|---|---|---|
| Mic 1 | 0 | 0.16 | 0.0229 | 0.1018 |
| Mic 2 | -0.16 | 0 | 0.0069 | 0.0858 |
| Mic 3 | -0.0229 | -0.069 | 0 | 0.0789 |
| Mic 4 | -0.1018 | -0.0858 | -0.0789 | 0 |

*FIG. 3B*

| | | | |
|---|---|---|---|
| L0,F0 | L1,F1 | L2,F2 | L3,F3 |
| L4,F4 | L5,F5 | L6,F6 | L7,F7 |
| L8,F8 | L9,F9 | L10,F10 | L11,F11 |
| L12,F12 | L13,F13 | L14,F14 | L15,F15 |

*FIG. 3C*

SOUND SOURCE LOCALIZATION SYSTEM

BACKGROUND OF THE INVENTION

1. Field of the Invention

The present invention generally relates to localization, and more particularly to a sound source localization system.

2. Description of Related Art

Sound source localization is the technique of determining the orientation and distance of a sound source with respect to multiple microphones. This technique has many applications in acoustic signal processing, such as speech recognition, audio surveillance, robot navigation and human-computer interaction, for example, to create spatial sound effects, enhancing speech intelligibility, and reducing background noise.

Sound source localization relies on various cues of the sound signals received by the microphones. Different systems and methods have been developed to exploit these cues and estimate the orientation and distance of the sound source.

Conventional sound source localization systems suffer low accuracy and response in various environments. A need has thus arisen to propose a novel scheme to overcome drawbacks of the conventional sound source localization systems and provide high accuracy and fast response in different scenarios.

SUMMARY OF THE INVENTION

In view of the foregoing, it is an object of the embodiment of the present invention to provide a sound source localization system adapted to determining a location of a sound source produced by an unknown speaker with improved accuracy, efficiency and speed by integrating multiple mechanisms.

According to one embodiment, a sound source localization system includes a microphone array, a room shape estimator, a lookup table (LUT) and a localizer. The microphone array is composed of a plurality of microphones each converting sound wave into a corresponding voice signal. The room shape estimator determines a room shape including a location map and a corresponding template voice feature map composed of template voice features associated with a virtual sound source disposed at different locations respectively, and outputs a room reliability indicating confidence about the determined room shape. The lookup table (LUT) pre-stores the location map and the corresponding template voice feature map. The localizer determines a location of a sound source according to the room reliability and similarity between a voice feature associated with the sound source and the template voice features of the template voice feature map.

BRIEF DESCRIPTION OF THE DRAWINGS

FIG. 3B shows an exemplary template voice feature of four microphones associated with a corresponding virtual sound source;

FIG. 3C shows an exemplary template voice feature map that is composed of template voice features associated with the virtual sound source at different locations F0 to F15 respectively.

DETAILED DESCRIPTION OF THE INVENTION

Figure 1:
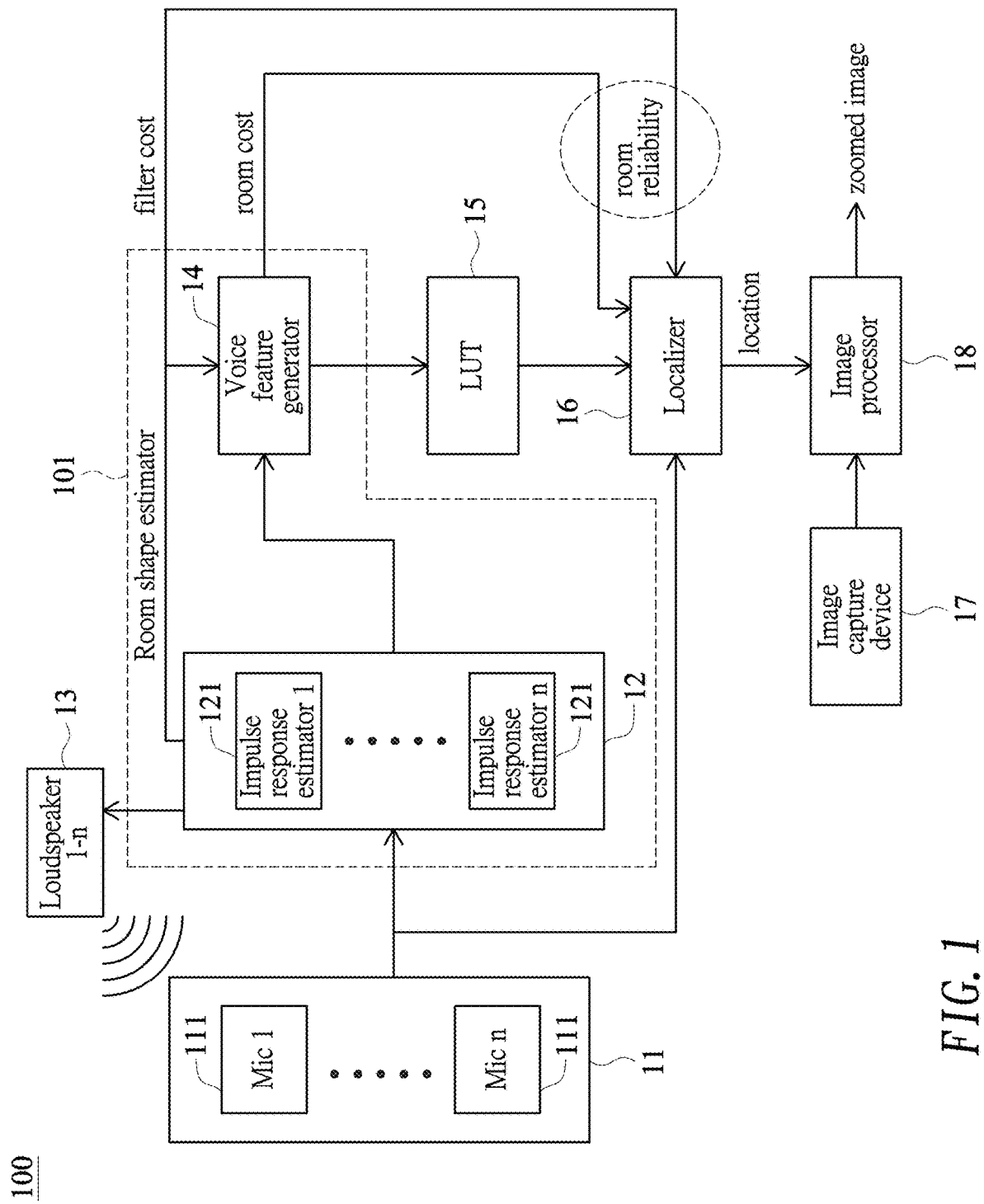
FIG. 1 shows a block diagram illustrating a sound source localization system according to one embodiment of the present invention.

FIG. 1 shows a block diagram illustrating a sound source localization system 100 according to one embodiment of the present invention. The sound source localization system 100 ("system" hereinafter) of the embodiment may be adapted to determining a location (e.g., orientation and distance) of a sound source, for example, produced by an (unknown) speaker at unknown location.

Specifically, the system 100 of the embodiment may include a microphone array 11 composed of a plurality of microphones (or mics) 111 each configured to convert sound wave into a corresponding voice signal.

The system 100 of the embodiment may include a room shape estimator 101 configured to determine a room shape including a location map and a corresponding template voice feature map composed of template voice features associated with a virtual sound sources disposed at different locations respectively, and to output a room reliability indicating confidence about the determined room shape. In more detail, a template voice feature represents the relation of voice signals respectively from the microphones, when a virtual sound source is disposed at a known location. Details of room shape estimation may be referred to "Can one hear the shape of a room: The 2-D polygonal case" by Ivan Dokmanić et al. and "Acoustic echoes reveal room shape" by Ivan Dokmanić et al., which are incorporated herein by reference.

Specifically, the room shape estimator 101 may include a room impulse response (RIR) estimator 12 composed of a plurality of impulse response estimators 121 each configured to generate a corresponding response filter of an associated microphone 111 according to the corresponding pilot voice signal from a known location loudspeaker 13. The RIR estimator 12 is activated only when estimating the room shape for making the template voice feature map. The room shape estimator 101 may include a voice feature generator 14 configured to estimate the room shape (space) and determine a plurality of locations in the room shape according to the response filters. Then the template voice feature at each location is estimated.

Figure 2:
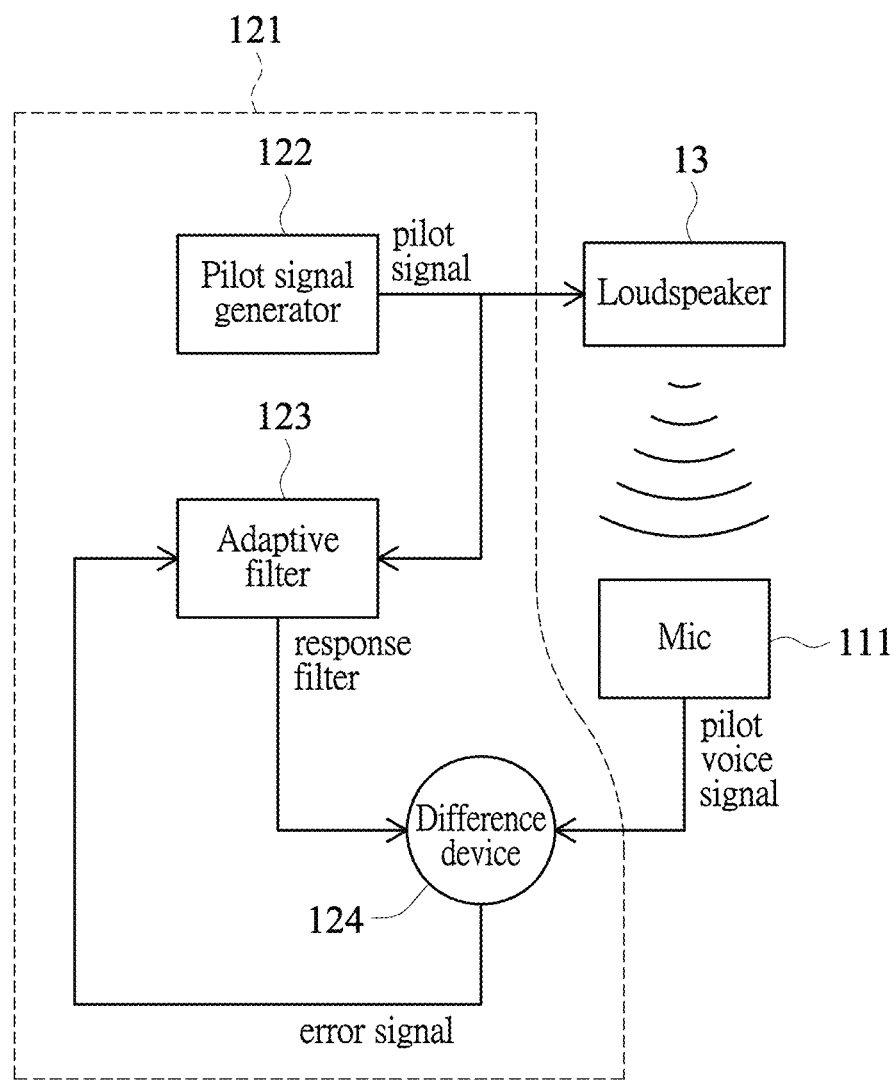
FIG. 2 shows a detailed block diagram of the impulse response estimator of FIG. 1.

FIG. 2 shows a detailed block diagram of the impulse response estimator 121 of FIG. 1. Specifically, the impulse response estimator 121 may include a pilot signal generator 122 configured to generate a pilot signal (transmitted wirelessly or wired connected) to a corresponding loudspeaker 13, which generates sound wave representing an impulse. The microphone 111 (of the microphone array 11) then generates a pilot voice signal according to received sound wave. The impulse response estimator 121 may include an adaptive filter 123 (e.g., digital filter) configured to output a response filter according to the pilot signal. The impulse response estimator 121 may include a difference device 124 configured to generate an error signal representing a difference between the pilot voice signal and the response filter, and the error signal is fed back to adaptively control the adaptive filter 123. Accordingly, the closed loop adaptive process of the adaptive filter 123 involves the use of a cost function that generates a filter cost, which is a criterion for optimum performance of the adaptive filter 123 and minimizing the cost on the next iteration.

Figure 3A:
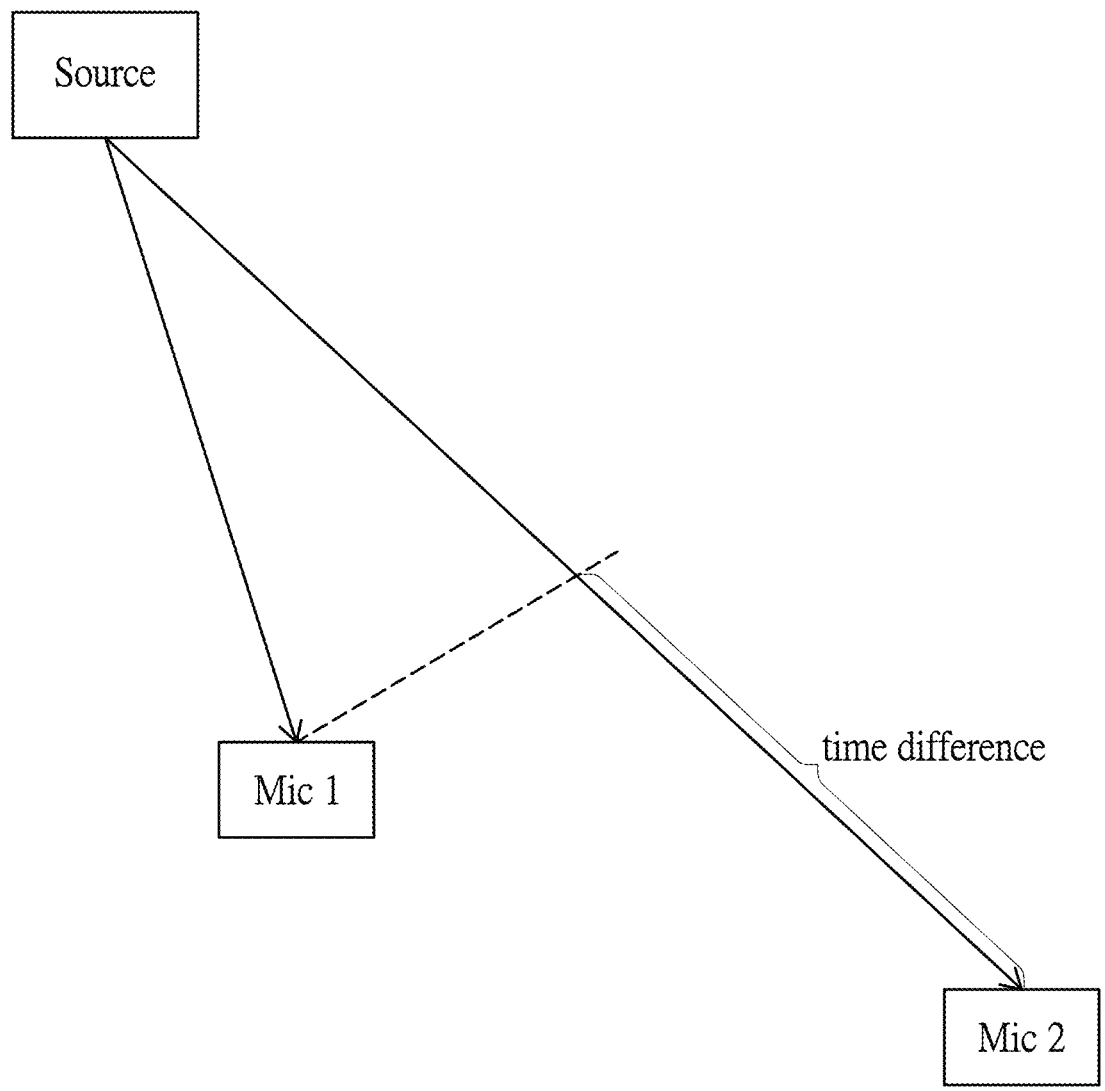
FIG. 3A shows a schematic diagram exemplifying time difference between voice signals of mic 1 and mic 2.

FIG. 3A shows a schematic diagram exemplifying time difference between voice signals of mic 1 and mic 2. As exemplified in FIG. 3A, the time difference is defined as the difference between a time at which the sound wave arrives at the mic 1 and another time at which the sound wave arrives at the mic 2. FIG. 3B shows an exemplary template voice feature of four microphones 111 associated with a virtual sound source at a known location in the room shape.

Further, a template voice feature map composed of template voice features associated with a virtual sound source respectively at different (known) locations in the room shape. FIG. 3C shows an exemplary template voice feature map that is composed of template voice features F0-F15 associated with the virtual sound source disposed at different locations L0 to L15 respectively, with the composing template voice feature F14 of FIG. 3B associated with the virtual sound source at the location L14. The system 100 of the embodiment may include a lookup table (LUT) 15, such as a memory device, configured to pre-store the location map and the corresponding template voice feature map composed of (expected) template voice features associated with the virtual sound source at different (known) locations.

In the embodiment, image source (IS) model is adopted to determine the shape of the room, details of which may be referred to the references as mentioned above. The image source (IS) model is a geometric simulation method that models specular sound reflection paths between the source and receiver. The image source model assumes that sound rays undergo perfect reflections when they encounter a boundary (such as a wall, floor or ceiling) and spawn a mirrored image source. The location of the image source can be derived from the peaks of the room impulse response (RIR), which indicate the arrival time and intensity of the reflected sound rays. As the determined peaks are contributed by the image source with high probability, the image source location may be accordingly derived.

In the embodiment, a cost function may be used to generate a room cost, which is a criterion for probability of the room shape. The room cost is minimized when the image sources are consistent with the actual room boundaries. In the embodiment, the room cost and the filter cost (of the RIR estimator 12) together constitute a room reliability indicating how confident the system 100 is about the estimated room shape, which is inversely proportional to a (weighted) sum of the filter cost and the room cost.

Figure 3D:
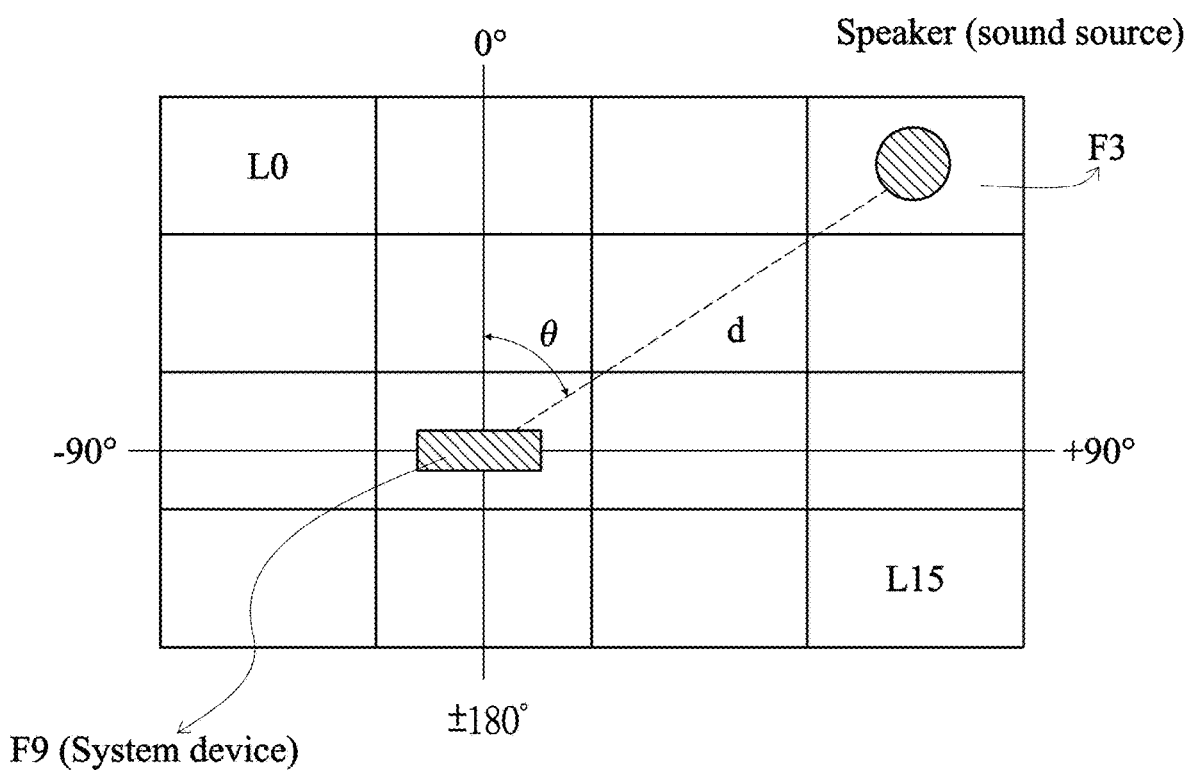
FIG. 3D shows an example of determining the location of a sound source.

The system 100 of the embodiment may include a localizer 16 configured to determine a location of (i.e., localize) a real sound source produced by an (unknown) speaker at unknown location according to similarity between a voice feature to be determined and the template voice feature map (stored in the LUT 15). Specifically, in an operation of determining the location of an (unknown) speaker (or sound source), a corresponding voice feature is determined by the localizer 16. In more detail, the voice feature is composed of (propagation) time differences between voice signals of (all) pairs of microphones 111. Next, the generated voice feature (associated with the sound source to be localized) is compared with the template voice features stored in the LUT 15. A similarity measure (or metric) is performed (for example, finding minimum difference or distance) between the generated voice feature (associated with the sound source to be localized) and each of the template voice features stored in the LUT 15. Accordingly, the location of the template voice feature in the template voice feature map with highest similarity (i.e., minimum difference or distance) is thus determined as the location of the sound source produced by the speaker to be localized. FIG. 3D shows an example of determining the location (L3) of a sound source (or speaker) having a voice feature that is most similar to the template voice feature F3 (at L3). Therefore, the sound source obtains the estimated orientation θ and the distance d with respect to the system device.

In addition to similarity between the voice feature to be determined and the template voice feature map (stored in the LUT 15), the localizer 16 may determine the location of the sound source further according to the room reliability. Specifically, the room shape estimator 101 determines a plurality of room shapes with corresponding room reliabilities, a location associated with highest (weighted) sum of the similarity and the room reliability is determined as the location of the sound source.

Referring back to FIG. 1, the system 100 of the embodiment may optionally include an image capture device 17, such as a camera, configured to generate a captured image representing the room where the (unknown) speaker (with unknown location) resides. The system 100 may further include an image processor 18 coupled to receive the captured image and configured to generate a zoomed (in or out) image according to the location as determined by the localizer 16, thereby facilitating subsequent processes such as verifying the identity of the speaker (i.e., the sound source).

Although specific embodiments have been illustrated and described, it will be appreciated by those skilled in the art that various modifications may be made without departing from the scope of the present invention, which is intended to be limited solely by the appended claims.

What is claimed is:

1. A sound source localization system, comprising:
   a microphone array composed of a plurality of microphones each converting sound wave into a corresponding voice signal;
   a room shape estimator that determines a room shape including a location map and a corresponding template voice feature map composed of template voice features associated with a virtual sound source disposed at different locations respectively, and outputs a room reliability indicating confidence about the determined room shape;
   a lookup table (LUT) that pre-stores the location map and the corresponding template voice feature map; and
   a localizer that determines a location of a sound source according to the room reliability and similarity between a voice feature associated with the sound source and the template voice features of the template voice feature map.

2. The system of claim 1, wherein the room shape estimator comprises a room impulse response (RIR) estimator composed of a plurality of impulse response estimators each comprising:
   a pilot signal generator that generates a pilot signal to a corresponding loudspeaker;
   an adaptive filter that outputs a response filter according to the pilot signal; and
   a difference device that generates an error signal representing a difference between the response filter and a pilot voice signal generated by a corresponding microphone, the error signal being fed back to adaptively control the adaptive filter.

3. The system of claim 1, wherein the template voice feature is composed of time differences between voice signals of pairs of microphones.

4. The system of claim 2, wherein the RIR estimator generates a filter cost, which is a criterion for optimum performance of the RIR estimator.

5. The system of claim 4, wherein the room shape estimator generates a room cost, which is a criterion for probability of the determined room shape.

6. The system of claim 5, wherein the room cost and the filter cost together constitute a room reliability indicating confidence about the determined room shape, the room reliability being inversely proportional to a weighted sum of the filter cost and the room cost.

7. The system of claim 6, wherein a location associated with highest weighted sum of the similarity and the room reliability is determined as the location of the sound source.

8. The system of claim 1, further comprising:
an image capture device that generates a captured image representing a room where the sound source resides.

9. The system of claim 8, further comprising:
an image processor coupled to receive the captured image and configured to generate a zoomed image according to the location as determined by the localizer.

\* \* \* \* \*